(12) United States Patent
Decker

(10) Patent No.: US 7,228,584 B2
(45) Date of Patent: Jun. 12, 2007

(54) PORTAL WASHING FACILITY FOR MOTOR VEHICLES

(75) Inventor: Wolfgang Decker, Zusmarshausen-Wollbach (DE)

(73) Assignee: Washtec Holding GmbH, Augsburg (DE)

( * ) Notice: Subject to any disclaimer, the term of this patent is extended or adjusted under 35 U.S.C. 154(b) by 667 days.

(21) Appl. No.: 10/613,933

(22) Filed: Jul. 1, 2003

(65) Prior Publication Data
US 2004/0064908 A1 Apr. 8, 2004

(30) Foreign Application Priority Data
Jul. 9, 2002 (EP) .................. 02015217

(51) Int. Cl.
*B60S 3/00* (2006.01)
(52) U.S. Cl. .............. 15/53.1; 15/88.4; 15/DIG. 2
(58) Field of Classification Search ............. None
See application file for complete search history.

(56) References Cited
U.S. PATENT DOCUMENTS
6,193,808 B1 * 2/2001 Decker .............. 134/6

FOREIGN PATENT DOCUMENTS

| DE | 197 51 016 C2 | 5/1999 |
|---|---|---|
| EP | 0 507 757 A1 | 10/1992 |
| EP | 0700 814 A1 | 3/1996 |
| EP | 0 808 754 A | 11/1997 |
| EP | 0 987 156 | 3/2000 |
| WO | WO 01/85505 | 11/2001 |

* cited by examiner

*Primary Examiner*—David Redding
(74) *Attorney, Agent, or Firm*—Martin Fleit; Paul D. Bianco; Fleit Kain Gibbons Gutman Bongini & Bianco, P.L.

(57) ABSTRACT

The invention relates to a portal washing facility for motor vehicles, in particular passenger motor vehicles, that includes a portal device that can move relative to the motor vehicle in its longitudinal direction, has at least one horizontal washing brush that is height-adjustable on the portal device, and at least one side washing brush that can move transverse to the direction of motion of the portal device. In order to have an effective, brushless high-pressure washing, in addition to washing with conventional washing brushes, at least one lateral high-pressure washing device is provided on the portal device and is used for high-pressure cleaning of the side surfaces and of the front and rear surfaces of the motor vehicle and can be driven along at least one traverse of the portal device transverse to the direction of motion of the portal device.

15 Claims, 3 Drawing Sheets

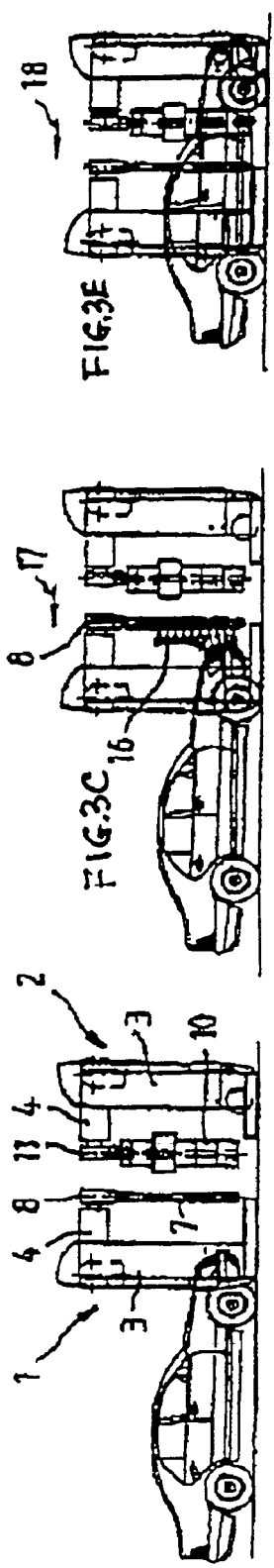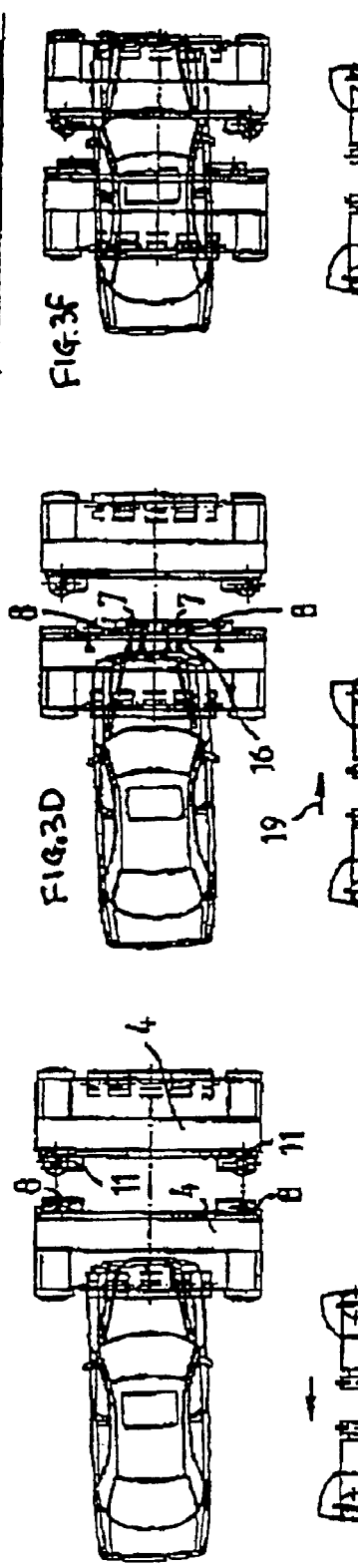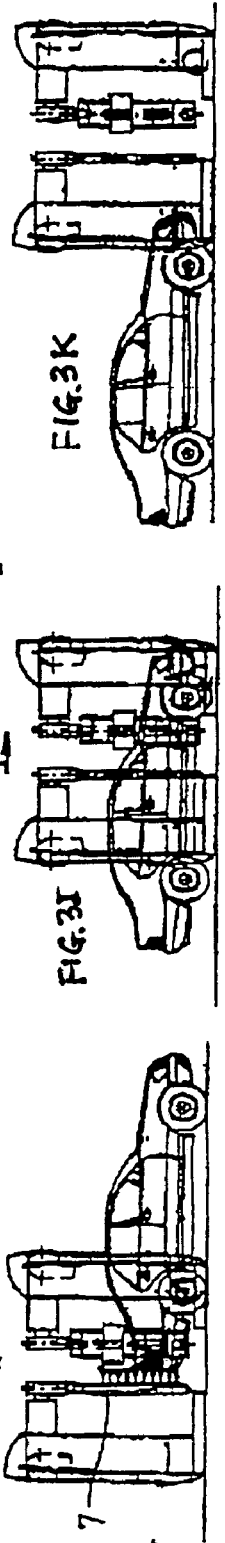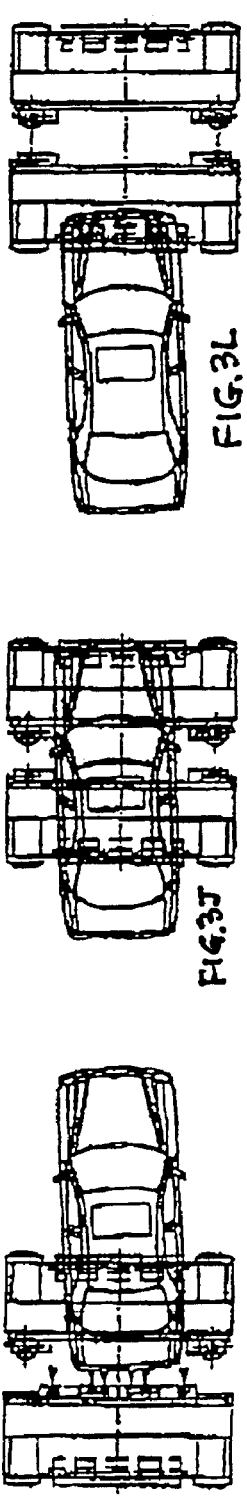

PORTAL WASHING FACILITY FOR MOTOR VEHICLES

BACKGROUND OF THE INVENTION

1. Field of the Invention

The invention relates to a portal washing facility for motor vehicles, in particular passenger motor vehicles.

2. Prior Art

From German Patent No. DE 197 51 016 C2, a related portal washing device is known for motor vehicles. It consists of a portal device made of two mutually linked portals, each one of which features a horizontal washing brush. Between the two horizontal washing brushes there is also a pair of opposing vertical washing brushes, which are connected to one of the two portals. In this kind of portal washing system, during a forward motion of the portal, the washing process begins first with the first horizontal washing brush on the front one-third of the motor vehicle, while the two vertical washing brushes perform a frontal washing. During the continuing forward movement of the portal, the second horizontal washing brush performs a repeated front washing, while the first horizontal washing brush washes the roof part and the two vertical washing brushes wash the side surfaces of the vehicle. Once the vertical washing brushes have reached the vehicle rear, they begin to move together and wash the vehicle rear. Then the direction of motion of the portal is reversed, and the washing process is continued with the brushes until the vertical washing brushes have passed the front of the vehicle. A portal washing system of this kind also makes it possible to have a particularly fast and effective brush cleaning while requiring very little space. However, it is designed only for brush cleaning.

Brushless washing systems are already known in which the vehicles to be cleaned are sprayed exclusively from above and from the side of the vehicle by using high-pressure, directed nozzles. A washing system of this kind is known from European Patent No. EP 0 507 757 B1. In the referenced document, the cleaning of the horizontal vehicle surfaces including the front and rear windshield takes place by means of a height-adjustable spray bar that rotates horizontally about its longitudinal axis. Also, the cleaning of the front and rear surfaces takes place by means of the horizontal spray bar which is lowered accordingly in front of the vehicle front and behind the vehicle rear. The cleaning of the vehicle side surfaces is carried out entirely by additional, lateral spray bars. However, this kind of system is designed specifically for a high-pressure wash, and a brush-cleaning cannot be used.

SUMMARY OF THE INVENTION

It is the object of the invention to create a portal washing device of the kind described above, which will allow washing with conventional washing brushes and also an effective, brushless high-pressure wash.

This is accomplished and the problem of the prior art is solved by providing a portal washing device or facility for motor vehicles, in particular passenger motor vehicles that includes a portal device that can move relative to the motor vehicle in its longitudinal direction, with at least one horizontal washing brush that is height-adjustable on the portal device, and with at least one side washing brush that moves transverse to the direction of motion of the portal device, characterized in that at least one lateral high-pressure washing device is provided on the portal device and is used for high-pressure cleaning of the side surfaces and of the front and rear surfaces of the motor vehicle and it can be driven along at least one traverse of the portal device transverse to the direction of motion of the portal device.

In the portal washing device according to this invention, the customer is able to perform on one and the same facility a conventional brush washing process, with all the known options, such as chemical prewash, washing and waxing process etc., and/or a highly effective, brushless high-pressure wash with a chemical prewash if desired. Due to the high pressure washing device that can move laterally at the traverse of the portal device transverse to the direction of motion, it is possible to wash not only the side surfaces of the vehicle, but also its front and rear surfaces, so that an effective high pressure wash with improved cleaning effect will be obtained, which is also particularly gentle on the paint.

In one particularly useful embodiment of the invention, the portal device consists of two portals linked together, and one of them has two side-washing brushes and the other has two lateral high-pressure washing devices. Thus, a particularly compact design is obtained, so that this kind of portal washing system can be installed in all standard car-washing sheds.

It is expedient to design the lateral high-pressure washing devices as nozzle-equipped high-pressure tubes that can rotate about their longitudinal axis. The high pressure tubes are connected to moving carts that can be moved by a motor drive unit along a horizontal guide on the at least one traverse of the portal device.

According to the invention the portal washing facility can include the improvement of the portal device containing a first portal and a second portal, one said portal mounting the at least one side washing brush and the other portal mounting the at least one lateral high-pressure washing unit; the improvement wherein the first portal and the second portal are linked together; the improvement wherein the lateral high-pressure washing device is a nozzle-equipped, vertical high pressure tube; the improvement wherein the lateral high-pressure washing device is located on a moving cart which can be driven along a horizontal guide by a motor along at least one traverse of the portal device; the improvement wherein the lateral high-pressure washing device can be rotated about its longitudinal axis; the improvement wherein at least two side washing brushes are provided that can move transverse to the direction of motion of the portal device, and also at least two high-pressure washing units are provided on the traverse of the portal device that can move transverse to its direction of motion; and/or the improvement wherein the lateral high-pressure washing devices can be moved at least up to the middle of the traverse.

Further the portal washing facility can include the improvement wherein a horizontal washing brush is mounted to each of the first portal and the second portal, and that the side washing brushes and the lateral high-pressure washing devices are located between the two horizontal washing brushes; the improvement wherein the at least one high-pressure washing device is connected to the first portal and the at least one side washing brush is connected to the second portal; the improvement wherein the at least one high-pressure washing device is connected to the second portal and the at least one side washing brush is connected to the first portal; and/or the improvement wherein at least one upper high-pressure washing device is provided on the portal device for high-pressure cleaning of the horizontal vehicle surfaces, including the front and the rear windshield.

The invention relates to a portal washing facility for motor vehicles, in particular passenger motor vehicles, that includes a portal device that can move relative to the motor vehicle in its longitudinal direction, has at least one horizontal washing brush that is height-adjustable on the portal device, and at least one side washing brush that can move transverse to the direction of motion of the portal device. In order to have an effective, brushless high-pressure washing, in addition to washing with conventional washing brushes, at least one lateral high-pressure washing device is provided on the portal device and is used for high-pressure cleaning of the side surfaces and of the front and rear surfaces of the motor vehicle and can be driven along at least one traverse of the portal device transverse to the direction of motion of the portal device.

Additional characteristics and advantages of the invention will become apparent from the following description of preferred embodiments when taken in conjunction with the figures of the drawing.

BRIEF DESCRIPTION OF THE DRAWING

The figures of the drawing consist of:

FIGS. 3A to 3L show the different phases of a high pressure wash with the combination portal washing system according to the invention as shown in FIG. 1 and is presented as a sequence of associated side views and top views.

DETAILED DESCRIPTION OF PREFERRED EMBODIMENTS OF THE INVENTION

Figure 1:
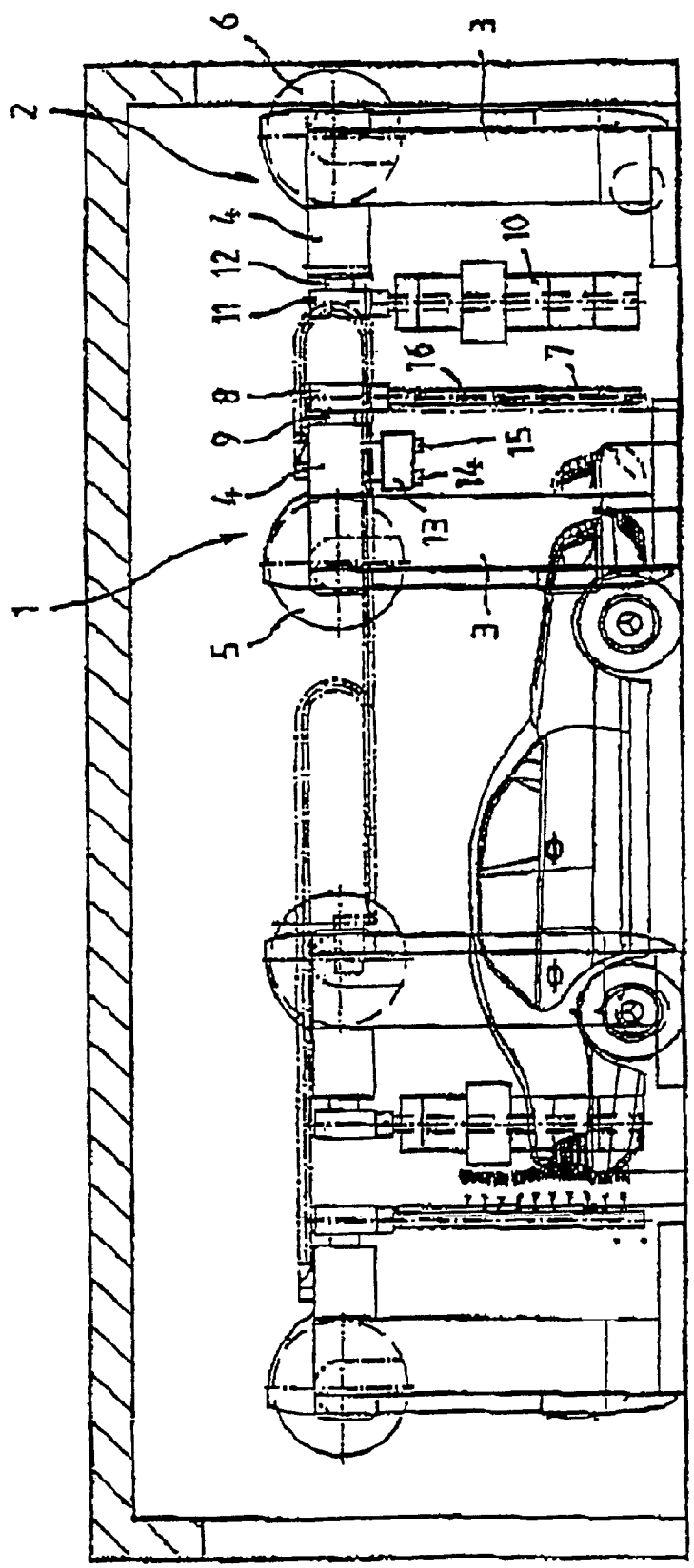
FIG. 1 shows a first embodiment of a combination portal washing system according to the invention and is shown in a schematic, side view.

The combination portal washing system, shown in the figures of the drawing for performing a brush wash and/or a high-pressure wash, features a portal device with two portals 1 and 2 that move relative to a vehicle in its longitudinal direction. The portals 1 and 2 have essentially the same design and each contain two side supports 3 and one horizontal traverse 4. Preferably they are securely linked together, so that they can be moved together by a single drive unit. A horizontal washing brush 5 or 6 is mounted to the two portals 1 and 2 in a known manner, and each can be elevated and lowered vertically by a suitable drive mechanism and each rotates around a horizontal axis. The portals 1 and 2 are positioned in a mirror-symmetrical array, so that their back-sides with the traverses 4 are facing each other.

In the embodiment presented in FIG. 1 there are two side-mounted, high-pressure washing devices positioned as vertical high-pressure tubes 7 on the first portal 1 and they can be moved transverse to the direction of movement of portal 1. The two high-pressure tubes 7 are located on the two moving carts 8 which run along a horizontal guide 9 transverse to the direction of motion 3 of the portal 1 and can be displaced along the traverse 4. The displacement of the two moving carts 8 takes place by means of a suitable servo-drive which is not illustrated in the figure. The horizontal guide 9 for the two moving carts 8 is designed in such a manner that the two high pressure tubes 7 can be moved at least up to the middle of the traverse 4. Preferably, the two moving carts 8 of the high pressure tubes 7 can be moved along the entire length of the traverse in order to achieve an overlapping of the high pressure tubes 7 during a front and rear washing. There are two side washing brushes 10 on the traverse 4 of the second portal 2 that can be displaced transverse to the direction of movement of the portal 2. Also, the side washing brushes 10 are located on two moving carts 11 which are moved by a servo-drive along a horizontal guide 12 transverse to the direction of movement of the portal and along the traverse 4 of the second portal 2. The left side of the figure shows the portals when they have traversed the length of the motor vehicle.

Figure 2:
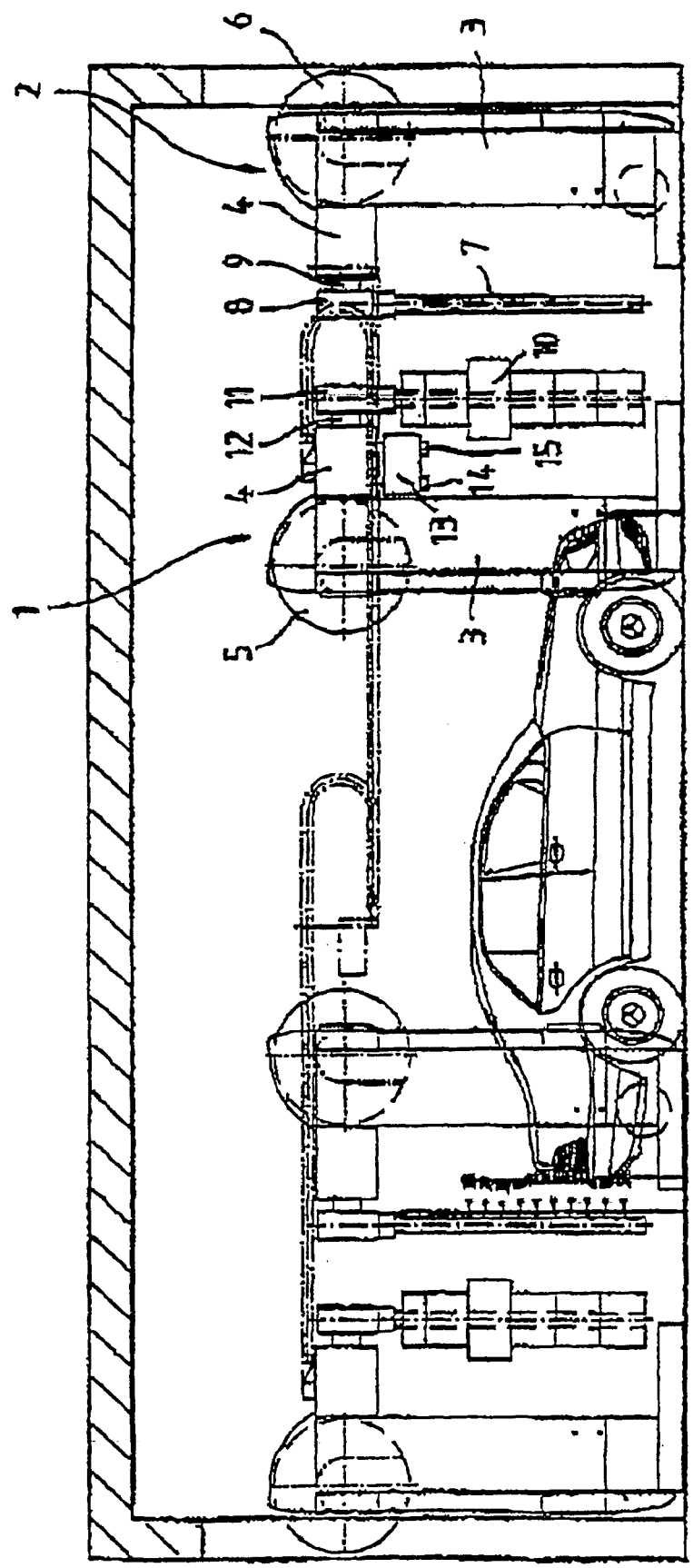
FIG. 2 shows a second embodiment of a combination portal washing system according to the invention and is shown in a schematic, side view.

In the illustration presented in FIG. 2, the two high pressure tubes 7 can be displaced along the traverse 4 of the second portal 2 and the two side washing brushes 10 can be displaced along the traverse 4 of the first portal 1. Otherwise, the portal washing system shown therein is designed according to that presented in FIG. 1.

As is evident from FIGS. 1 and 2, there is a height-adjustable transverse bar 13 on at least one traverse 4 of the two portals 1 and 2; it has an upper, horizontal high pressure washing device—also designed as a high pressure tube 14—and a horizontal drying device 15. But height-adjustable transverse bars 13 can also be provided on the two traverses 4 of the portals 1 and 2 accordingly, wherein then a horizontal high pressure tube 14 can be positioned on the one transverse bar and a drying device 15 (designed as a drying nozzle, for example) can be located on the other transverse bar. But it is also possible to have a design with two transverse bars 13 having both one high pressure tube 14 and also one drying device 15.

The horizontal high pressure tube 14 for the high pressure washing of the upper regions of the vehicle, including the engine hood, the trunk and the front and rear windshields, and the two vertical high pressure tubes 7 for cleaning of the front, rear and side surfaces of the vehicle have suitable, lateral high-pressure nozzles 16 and can turn about their longitudinal axis by means of an appropriate rotary drive. Thus, the optimum angle of impact of the high-pressure jet onto the particular surface can be adjusted.

It is also possible to provide side drying nozzles (not illustrated) on the side supports 3 of one or both portals 1 and 2 for drying of the two side surfaces of the motor vehicle. Furthermore, wheel washing devices and/or application units for washing agents, rinsing agents, drying agents and/or preservatives or such, can be located on the portals 1 and 2.

A sensor is provided on the portal device or on another suitable site within the washing system to ascertain the vehicle contours. The determination of the vehicle contour can take place, for example, by contact sensors in the form of sensing devices, etc., or by contactless sensors. A contactless determination of the vehicle contour can take place, for example, by means of electromagnetic waves or sound waves using light barriers, ultrasonic sensors or such. Depending on the information determined by the sensor unit, the drive unit for the portal, the servo-drive for the lateral displacement movements of the high pressure tubes 7 or 14, and the rotary drives for the high pressure tubes 7 and 14 can be controlled in such a manner that the high pressure nozzles will have a predetermined spacing and an optimum alignment to the corresponding vehicle surface. Also, the control of the side washing brushes 10 takes place on the basis of the data ascertained by the sensor array.

Based on FIGS. 3A to 3L the process of operation of a high-pressure car wash will be described below with respect to the novel combination portal washing system like that described above and illustrated in FIG. 1. In its starting position illustrated in the top left, FIGS. 3A and 3B, the two high pressure tubes 7 are driven into their outermost stand-by positions and the first portal 1 is positioned so that the two high pressure tubes 7 are located at a specified distance in front of the vehicle front. The two high pressure tubes 7 are then driven to the middle of the traverse 4 and by movement of the two portals 1 and 2, see FIGS. 3C and 3D, they are driven in the direction of the arrow 17 up to a specified distance from the vehicle front, as is indicated from the upper illustrations. In addition, the two high-pressure tubes 7 are turned about their longitudinal axis so that the high-pressure nozzles 16 are directed toward the front of the vehicle. As soon as the two high-pressure tubes 7 have reached the specified distance from the front of the vehicle, the movement of the portals 1 and 2 is stopped and the two high-pressure tubes 7 are supplied with high-pressure water. Both high pressure tubes 7 are then moved by corresponding movement of the moving carts 8 together onto one side (to the left or right), in order to reach an overlap at the middle section of the vehicle. Then the one high-pressure tube 7 can be further moved to one side, while the other high-pressure tube 7 is reversed and moved to the opposite side. Then, the two high-pressure tubes 7 are turned by 90° for cleaning of the side surfaces. According to the top right illustration shown in FIGS. 3E and 3F, the two portals 1 and 2 are then further moved in the direction of the arrow 18, while the high pressure tubes 7 are moved along the side surface of the vehicle using a contour control. The control of the displacement motions is carried out on the basis of the determination of contour obtained by the sensor unit. Thus it can be assured that the high pressure nozzles 16 have an ideal spacing and an optimum alignment to the vehicle. When the rear of the vehicle is detected, the two high-pressure tubes 7 are rotated by 90° to the rear, as is indicated in the left, lower illustration in FIGS. 3G and 3H. Then a corresponding rear washing with overlapping in the middle of the vehicle is performed in a similar manner to that described for the front wash, see FIGS. 3I and 3J. Next, the two high-pressure tubes 7 are driven to their outer stand-by position. Then the two portals 1 and 2 are moved back into their starting position in the direction of the arrow 19 to reach the position shown in FIGS. 3K and 3L.

Simultaneous with the washing by the lateral high pressure tubes 7 or at a time delay during an additional machine run, the horizontal surfaces of the vehicle, including the front and rear windshields, are cleaned by the horizontal nozzle 14 or a horizontal high pressure tube integrated into the lateral high pressure nozzles.

Instead of or in addition to the high pressure cleaning, a brush washing can be carried out in the known manner with the two horizontal washing brushes and the two side washing brushes.

The invention is not limited to the embodiment described above and presented in the figures. For example, instead of two portals linked directly together, a single, larger portal can be used, to which the components described above are attached. Instead of two lateral high pressure washing devices, only one lateral high pressure device can be provided, which will allow a high pressure cleaning of the side surfaces and of the front and rear surfaces of the motor vehicle by means of corresponding displacement movements at the portal.

Although the invention has been descried in conjunction with preferred embodiments, changes and modifications will be evident to persons skilled in the art which do not depart from the teachings herein. Such changes and modifications are deemed to fall within the purview of the invention as claimed.

What is claimed is:

1. In a portal washing facility for motor vehicles, in particular passenger motor vehicles, that includes a portal device movable relative to the motor vehicle in its longitudinal direction, with at least one horizontal washing brush that is height-adjustable on the portal device, and with at least one side washing brush that moves transverse to the direction of motion of the portal device, the improvement comprising, at least one traverse of the portal device, at least one lateral high-pressure washing device mounted on the traverse of the portal device for high-pressure cleaning of the side surfaces and of the front and rear surfaces of the motor vehicle, said at least one lateral high-pressure washing device being movable on the traverse to move transversely to the direction of motion of the portal device.

2. In a portal washing facility according to claim 1, the improvement of the portal device containing a first portal and a second portal, one said portal mounting the at least one side washing brush and the other portal mounting the at least one lateral high-pressure washing unit.

3. In a portal washing facility according to claim 2, the improvement wherein the first portal and the second portal are linked together.

4. In a portal washing facility according to claim 1, the improvement wherein the lateral high-pressure washing device is a nozzle-equipped, vertical high pressure tube.

5. In a portal washing facility according to claim 1, the improvement wherein the lateral high-pressure washing device is located on a moving cart which can be driven along a horizontal guide by a motor along at least one traverse of the portal device.

6. In a portal washing facility according to claim 1, the improvement wherein the lateral high-pressure washing device can be rotated about its longitudinal axis.

7. In a portal washing facility according to claim 1, the improvement wherein at least two side washing brushes are provided that can move transverse to the direction of motion of the portal device, and also at least two high-pressure washing units are provided on the traverse of the portal device that can move transverse to its direction of motion.

8. In a portal washing facility according to claim 7, the improvement wherein the lateral high-pressure washing devices can be moved at least up to the middle of the traverse.

9. In a portal washing facility according to claim 7, the improvement wherein a horizontal washing brush is mounted to each of the first portal and the second portal, and that the side washing brushes and the lateral high-pressure washing devices are located between the two horizontal washing brushes.

10. In a portal washing facility according to claim 2, the improvement wherein the at least one high-pressure washing device is connected to the first portal and the at least one side washing brush is connected to the second portal.

11. In a portal washing facility according to claim 2, the improvement wherein the at least one high-pressure washing device is connected to the second portal and the at least one side washing brush is connected to the first portal.

12. In a portal washing facility according to claim 1, the improvement wherein at least one upper high-pressure washing device is provided on the portal device for high-pressure cleaning of the horizontal vehicle surfaces, including the front and the rear windshield.

13. A portal washing facility for a motor vehicle having front, rear, and side surfaces, the portal washing facility comprising:

a portal device having a traverse and movable relative to a longitudinal of the motor vehicle;

at least one horizontal washing brush that is height-adjustable on the portal device; and at least one side washing brush movable transverse to the direction of motion of the portal device, wherein at least one lateral high-pressure washing device is mounted on the traverse of the portal device, said at least one lateral high-pressure washing device movable on the traverse to move transversely to the direction of motion of the portal device, and said at least one lateral high-pressure washing device configured, dimensioned, and movably arranged for high-pressure cleaning of the front, rear, and side surfaces of the motor vehicle.

14. The portal washing facility of claim 13 wherein the portal device includes first and second portals, one said portal mounting the at least one side washing brush and the other portal mounting the at least one lateral high-pressure washing unit.

15. The portal washing facility of claim 14, wherein the first and second portals are linked together.

* * * * *